(12) United States Patent
Makinen et al.

(10) Patent No.: US 7,982,588 B2
(45) Date of Patent: *Jul. 19, 2011

(54) METHOD AND APPARATUS FOR SENSORY STIMULATION

(75) Inventors: Ville Makinen, Espoo (FI); Petro Suvanto, Vantaa (FI); Jukka Linjama, Espoo (FI)

(73) Assignee: Senseg Ltd., Helsinki (FI)

( * ) Notice: Subject to any disclaimer, the term of this patent is extended or adjusted under 35 U.S.C. 154(b) by 407 days.

This patent is subject to a terminal disclaimer.

(21) Appl. No.: 12/232,548

(22) Filed: Sep. 18, 2008

(65) Prior Publication Data

US 2009/0079550 A1  Mar. 26, 2009

Related U.S. Application Data

(60) Provisional application No. 60/690,899, filed on Oct. 18, 2007.

(30) Foreign Application Priority Data

| Sep. 18, 2007 | (FI) | 20075651 |
| Mar. 14, 2008 | (FI) | 20080213 |
| May 19, 2008 | (FI) | 20085472 |
| May 19, 2008 | (FI) | 20085475 |

(51) Int. Cl.
 *G08B 6/00* (2006.01)
(52) U.S. Cl. ............ 340/407.2; 340/691.2; 340/530
(58) Field of Classification Search .......... 340/407.2, 340/429, 428, 514–515, 525, 530, 535, 538.16, 340/545.4, 562, 686.6, 691.2, 691.6, 692, 340/691.7
See application file for complete search history.

(56) References Cited

U.S. PATENT DOCUMENTS

| 3,267,931 A |   | 8/1966 | Puharich et al. |
| 5,436,565 A | * | 7/1995 | Gammell ............ 324/679 |
| 5,929,573 A | * | 7/1999 | Louwers et al. ....... 315/219 |

(Continued)

FOREIGN PATENT DOCUMENTS

EP  1731993 A1  12/2006

(Continued)

OTHER PUBLICATIONS

Kuroki et al., "Proposal for tactile sense presentation that combines electrical and mechanical stimulus" Second Joint EuroHaptics Conference and Symposium on Haptic Interfaces for Virtual Environment and Teleoperator Systems (WHC'07), IEEE.

(Continued)

*Primary Examiner* — Daniel Previl
(74) *Attorney, Agent, or Firm* — Schwegman, Lundberg & Woessner, P.A.

(57) ABSTRACT

An apparatus for producing an electrosensory sensation to a body member (120). The apparatus comprises one or more conducting electrodes (106), each of which is provided with an insulator (108). When the body member (120) is proximate to the conducting electrode, the insulator prevents flow of direct current from the conducting electrode to the body member. A capacitive coupling over the insulator (108) is formed between the conducting electrode (106) and the body member (120). The conducting electrodes are driven by an electrical input which comprises a low-frequency component (114) in a frequency range between 10 Hz and 500 Hz. The capacitive coupling and electrical input are dimensioned to produce an electrosensory sensation. The apparatus is capable of producing the electrosensory sensation independently of any mechanical vibration of the one or more conducting electrodes (106) or insulators (108).

21 Claims, 8 Drawing Sheets

U.S. PATENT DOCUMENTS

| | | | |
|---|---|---|---|
| 6,815,657 B2* | 11/2004 | Toyoshima et al. | 250/214 R |
| 2003/0067449 A1 | 4/2003 | Yoshikawa et al. | |
| 2004/0104887 A1 | 6/2004 | Tsukamoto et al. | |
| 2004/0192423 A1* | 9/2004 | Nevermann | 455/575.6 |
| 2004/0220485 A1* | 11/2004 | Rytky | 600/509 |
| 2005/0030166 A1 | 2/2005 | Kraus et al. | |
| 2005/0057528 A1* | 3/2005 | Kleen | 345/173 |
| 2008/0143693 A1 | 6/2008 | Schena | |
| 2008/0174415 A1 | 7/2008 | Tanida et al. | |
| 2009/0109007 A1 | 4/2009 | Makinen et al. | |
| 2011/0074733 A1 | 3/2011 | Mäkinen et al. | |

FOREIGN PATENT DOCUMENTS

| | | |
|---|---|---|
| EP | 1939712 A1 | 7/2008 |
| FI | 20080213 | 11/2008 |
| JP | 3543097 B2 | 7/2004 |
| WO | WO-02/073587 A1 | 9/2002 |
| WO | WO-02073587 | 9/2002 |
| WO | WO-2004051451 A2 | 6/2004 |
| WO | WO-2007/111909 A2 | 10/2007 |
| WO | WO-2009037379 | 3/2009 |
| WO | WO-2009141502 A1 | 11/2009 |
| WO | WO-2010037894 A1 | 4/2010 |

OTHER PUBLICATIONS

Kajimoto et al., "Psychophysical evaluation of receptor selectivity in electro-tactile display".

Kajimoto et al., Tactile Feeling Display using Functional Electrical Stimulation, ICAT '99.

Eric Gunther, Skincape, A Tool for composition in the Tactile Modality.

Kajimoto, et al., "Psychophysical evaluation of receptor selectivity in electro-tactile display", 13th International Symposium on Measurement and Control in Robotics (ISMCR), Madrid, Spain. http://files.tachilab.org/intconf2000/kajimoto200312ISMCR.pdf, (2003), 4 pgs.

Kajimoto, et al., "Tactile Feeling Display using Functional Electrical Stimulation", 9th International Conference on Artificial Reality and Tele-Existence (ICAT'99), Tokyo, Japan. http://files.tachilab.org/intconf1900/kajimoto1999ICAT.pdf, (1999), 8 pgs.

Kuroki, S., et al., "Proposal for tactile sense presentation that combines electrical and mechanical stimulus", Second Joint EuroHaptics Conference, 2007 and Symposium on Haptic Interfaces for Virtual Environment and Teleoperator Systems (WHC 2007). IEEE, (2007), 6 pgs.

Kaczmarek et al., "Polarity Effect in Electrovibration for Tactile Display", IEEE Transactions on Biomedical Engineering, vol. 53, No. 10, Oct. 2006, pp. 2047-2054.

Yamamoto et al., "Electrostatic Tactile Display with Thin Film Slider and Its Application to Tactile Telepresentation Systems", IEEE Transactions on Visualization and Computer Graphics, vol. 12, No. 12, Mar./Apr. 2006, pp. 168-177.

Agarwal et al., "A Hybrid Natural/Artificial Electrostatic Actuator for Tactile Stimulation" 2nd Annual International IEEE-EMBS Special Topic Conference on Microtechnologies in Medicine & Biology, May 2-4, 2002, pp. 341-345.

Beebe et al., "A Polyimide-on-silicon Electrostatic Fingertip Tactile Display", IEEE-EMBC and CMBEC, vol. 2, 1995, pp. 1545-1546.

Kaczmarek et al., "Electrotactile and Vibrotactile Displays for Sensory Substitution Systems", Transactions on Biomedical Engineering, vol. 38, No. 1, Jan. 1, 1991, pp. 1-16.

Reilly et al., "Electrocutaneous Stimulation with High Voltage Capacitive Discharges", IEEE Transactions on Biomedical Engineering, vol. BME-30, No. 10, Oct. 1983, pp. 631-641.

Kajimoto et al., "Electro-Tactile Display with Tactile Primary Color Approach", Proceedings of International Conference on Intelligent Robots and Systems, 2004.

Pfeiffer E. A., "Electrical Stimulation of Sensory Nerves With Skin Electrodes for Research, Diagnosis, Communication and Behavioral Conditioning: A Survey", Med. & biol. Engng. vol. 6, Pergamon Press, 1968, pp. 637-651.

"U.S. Appl. No. 12/232,536, Non Final Office Action mailed Dec. 14, 2010", 7 pgs.

"U.S. Appl. No. 12/232,536, Notice of Allowance mailed Feb. 22, 2011", 5 pgs.

"U.S. Appl. No. 12/232,536. Response filed Feb. 8, 2011 to Non Final Office Action mailed Dec. 14, 2010", 9 pgs.

"U.S. Appl. No. 12/232,548, Response filed Apr. 4, 2011 to Non-Final Office Action Received Jan. 7, 2011", 12 pgs.

"U.S. Appl. No. 12/993,784, Preliminary Amendment filed Nov. 19, 2010", 9 pgs.

"U.S. Appl. No. 12/993,784, Supplemental Preliminary Amendment filed Dec, 7, 2010", 4 pgs.

"U.S. Appl. No. 13/122,113, Preliminary Amendment filed Mar. 31, 2011", 7 pgs.

"International Application Serial No. PCT/FI2008/050550, PCT Search Report mailed Jun. 12, 2009", 3 pgs.

Agarwal, A. K, et al., "A hybrid natural/artificial electrostatic actuator for tactile stimulation", 2nd Annual International IEEE-EMB Special Topic Conference on Microtechnologies in Medicine & Biology, Abstract; sections II.A, II.B and III.A; figures 1-2, (2002), 341-345.

Fukumoto, M., et al., "Active Click: Tactile Feedback for Touch Panels", New York: ACM, ISBN 1-58113-340-5, Whole document, (2001), 121-122.

Linjama, Jukka, et al., "E-Sense screen: Novel haptic display with Capacitive Electrosensory Interface", Demo paper Submitted for HAID 09, 4thWorkshop for Haptic and Audio Interaction Design, Dresden, Germany, (Sep. 10-11, 2009), 1-2.

Poupyrev, I., et al., "Ambient touch: designing tactile interfaces for handheld devices", UIST '02 Proceedings of the 15th annual ACM symposium on User interface software and technology, XP 001171567, abstract; section 'TouchEngine display', (2002), 51-60.

Rekimoto, J, et al., "SmartSkin: An Infrastructure for Freehand Manipulation on Interactive Surfaces.", CHI '02 Proceedings of the SIGCHI conference on Human factors in computing systems: Changing our world, changing ourselves, XP 001099406, abstract; figure 2; section 'SmartSkin sensor architecture'; firgures 12-14; sections 'Interactions by using fingers and hand gestures' and 'Combination with tactile feedback', (2002), 113-120.

Tang, H., et al., "A Microfabricated Electrostatic Haptic Display for Persons with Visual Impairments", IEEE Transactions on Rehabilitation Engineering, ISSN 1063-6528, vol. 6, No. 3,, XP 011053920, abstract; Figure 1; sections II.A, II.B and II.D, (Sep. 1998), 241-248.

\* cited by examiner

METHOD AND APPARATUS FOR SENSORY STIMULATION

This Nonprovisional application claims priority under 35 U.S.C. §119(e) on U.S. Provisional Application Nos. 60/960,899 filed on Oct. 18, 2007, this application also claims priority under 35 U.S.C. §119(a) on Patent Application No(s). 20075651, 20080213, 20085475 and 20085472 filed in Finland on Sep. 18, 2007, Mar. 14, 2008, May 19, 2008, and May 19, 2008, respectively, the entire contents of which are hereby incorporated by reference.

BACKGROUND OF THE INVENTION

The present invention relates to an apparatus and method for sensory stimulation. The invention is particularly applicable for stimulating the sense of touch.

Manual input devices, such as joysticks and mice, are frequently complemented by means for providing tactile sensations such that the manual input devices provide tactile feedback to their users. There are hundreds of U.S. patents for tactile feedback devices. In most or all of the prior art devices the tactile stimulation is generated by means of moving or vibrating mechanical members. A problem shared by most such devices is that such moving mechanical members tend to be bulky, unreliable and/or difficult to control.

BRIEF DESCRIPTION OF THE INVENTION

An object of the present invention is to provide a method and apparatus for alleviating at least one of the problems identified above.

The object of the invention is achieved by features which are disclosed in the attached independent claims. The dependent claims and the present patent specification disclosed additional specific embodiments and non-essential features of the invention.

The invention is based on the surprising discovery that subcutaneous Pacinian corpuscles can be stimulated by means of a capacitive electrical coupling and an appropriately dimensioned control voltage, either without any mechanical stimulation of the Pacinian corpuscles or as an additional stimulation separate from such mechanical stimulation. An appropriately dimensioned high voltage is used as the control voltage. In the present context a high voltage means such a voltage that direct galvanic contact must be prevented for reasons of safety and/or user comfort. This results in a capacitive coupling between the Pacinian corpuscles and the apparatus causing the stimulation, wherein one side of the capacitive coupling is formed by at least one galvanically isolated electrode connected to the stimulating apparatus, while the other side, in close proximity to the electrode, is formed by the body member, preferably a finger, of the stimulation target, such as the user of the apparatus, and more specifically the subcutaneous Pacinian corpuscles.

Without committing themselves to any particular theory, the inventors find it likely that the invention is based on a controlled formation of an electric field between an active surface of the apparatus and the body member, such as a finger, approaching or touching it. The electric field tends to give rise to an opposite charge on the proximate finger. A local electric field and a capacitive coupling can be formed between the charges. The electric field directs a force on the charge of the finger tissue. By appropriately altering the electric field a force capable of moving the tissue may arise, whereby the sensory receptors sense such movement as vibration.

A benefit of the invention is independence from mechanical vibration and its associated problems in the prior art.

An aspect of the invention is an apparatus for generating an electrosensory stimulus to at least one body member. The apparatus comprises one or more conducting electrodes each of which is provided with an insulator. When the body member is proximate to the conducting electrode, the insulator prevents flow of direct current from the conducting electrode to the body member. A capacitive coupling over the insulator is formed between the conducting electrode and the body member. The apparatus also comprises a high-voltage source for applying an electrical input to the one or more conducting electrodes, wherein the electrical input comprises a low-frequency component in a frequency range between 10 Hz and 1000 Hz. The capacitive coupling and electrical input are dimensioned to produce an electrosensory sensation which is produced independently of any mechanical vibration of the one or more conducting electrodes or insulators.

Another aspect of the invention is a method for causing an electrosensory sensation to a body member. The method comprises providing one or more conducting electrodes. Each conducting electrode is provided with an insulator wherein, when the body member is proximate to the conducting electrode, the insulator prevents flow of direct current from the conducting electrode to the body member. A capacitive coupling over the insulator is formed between the conducting electrode and the body member. A high-voltage source is provided for applying an electrical input to the one or more conducting electrodes. The electrical input comprises a low-frequency component in a frequency range between 10 Hz and 1000 Hz, while the capacitive coupling and electrical input are dimensioned to produce an electrosensory sensation. The electrosensory sensation is produced independently of any mechanical vibration of the one or more conducting electrode(s) or insulator(s).

It is beneficial to vary the capacitive coupling such that the variation comprises one or more frequency components in a range wherein the Pacinian corpuscles exhibit their maximal sensitivity. This frequency range is roughly 10 to 1000 Hz and in most humans 100 to 500 Hz. The capacitive coupling can be varied by varying the control voltage and/or parameters of the capacitive coupling.

By way of example, the high-voltage charge applied to the electrode can have a voltage of at least 750, 1000, 1500 or 2000 V and at most 20, 50 or 100 kV (no-load measurements). In the present context, voltage values may refer to voltage in direct current or effective (RMS) voltages in alternating current. The high-voltage current applied may be direct current or alternating current. When alternating current is being used, the frequency of the current may be high, such as at least 1 kHz, 10 kHz, 20 kHz or 30 kHz and at most 100 kHz, 500 kHz tai 1 MHz, provided that the signal also exhibits a low-frequency component, for example such that high-frequency signal has an envelope whose frequency stimulates the desired sensory cells. The high-frequency alternating current can be modulated by means of a control signal having a low-frequency component, for example.

When high-voltage direct current is being used, the electrode may be embodied as a MEMS component (micro electromechanical system), which comprises a set of rotating, preferably individually controllable tiny electrodes. The strength of the capacitive coupling formed by the electrode can be adjusted by adjusting these tiny electrodes. In this case the strongest coupling is achieved when the tiny electrodes are oriented such that they collectively form a plane. In the inventive technique, by measuring the characteristics of the capacitive coupling, for example the capacitance of its variation, it may be possible to measure the distance of the body member from the surface of the apparatus, for example. Additionally, it may possible to detect separately the touching of the surface by the body member. The inventive technique may be further enhanced by power control functionality of the electric field being formed, for example. Utilization of some embodiments of the invention in the implementation of a proximity sensor may require a weaker electric field than what is required by causing the inventive sensory stimulus. Accordingly it may be beneficial to be able to vary the strength of the electric field depending on the currently needed functionality. Such variation may, for instance, involve strengthening the electric field such that a sense of touch or vibration is caused in the body member when it is brought sufficiently close to the electrode or insulator.

By way of example, the low-frequency component of the control signal being used in the inventive technique may be generated by modulating a high-frequency alternating current. The modulation signal may be continuous or pulsed, for example. The duration of individual pulses may be 0.01, 0.5 or 4 ms and the pause between pulses can be at least 1, 10 or 100 ms.

The low-frequency component of the control signal may have a frequency of at least 10, 50 or 100 Hz and at most 300, 500 or 1000 Hz. In one specific embodiment the control signal has an exemplary frequency of 120 Hz. In the inventive technique the alternating electric field, which causes the stimulus to be provided, may exhibit an intensity peak of at least 100 V/mm, 200 V/mm or 500 V/mm and at most 10 kV/mm, 30 kV/mm or 100 kV/mm. The field strength may be measured, for example, by means of a grounded electrode with a surface area of eg 1 $cm^2$ positioned 0.05 to 5 mm, preferably about 1 mm from the surface of the insulated electrode.

By way of example, the electric field generated by the electrode can be controlled according to a processing logic being executed in a computer or other electronic data processing apparatus. For example, the control logic can be used to control the variation frequency and/or intensity of the electric field generated by an individual electrode. Furthermore, the control logic can be used to pulse the varying electric field, for example. The control logic can also receive control information via a data network from a another apparatus, such as another computer or data processing apparatus.

An inventive apparatus for sensory stimulation comprises at least one insulated electrode, wherein the apparatus is operable to apply a charge to the electrode such that the charge causes a stimulation of the Pacinian corpuscles. For humans this normally requires a voltage of at least 750 V. The apparatus further comprises means for varying the intensity of the charge-generated, capacitively-coupled electric field by utilizing a signal having a component with a frequency of at least 10 Hz and at most 1000 Hz.

Some embodiments of the inventive apparatus can be implemented, when so desired, without mechanically moving parts, and such embodiments do not pose similar restrictions on the mechanical characteristics of the materials as do actuators based on mechanical movement of the surface. Accordingly, some embodiments of the invention are applicable to a wide variety of surfaces of different shapes. For instance, the surface shape of the electrode and/or insulator attached to it may be planar, rounded, spherical or concave. Likewise, the insulator material can be selected from a variety of materials having characteristics particularly suitable for the chosen application. As regards mechanical characteristics, the surface material can be hard, soft, stiff, bending, transparent or flexible. The surface, as well as the material being used as the conductor, can also be transparent.

An individual electrode of the apparatus and/or the insulator attached to the electrode can have a surface area of 0.1, 1, 10 or 100 $cm^2$ or more. The apparatus can comprise multiple insulated electrodes which can be arranged in an array forming an X-Y coordinate system. Each electrode of such a system can, when so desired, be controlled by a control logic according to some embodiments of the invention, for example. The electrodes can be fixedly mounted or movable.

The apparatus may comprise means for varying the variation frequency of the electric field, for example by modulating the high-voltage alternating current or by moving the electrodes of the MEMS device according to the control signal.

The insulator to be arranged between the electrode of the apparatus and the body member can have a thickness of at least 0.01 mm, 0.05 mm, 0.1 mm or 0.5 mm and at most 10 mm, 20 mm or 50 mm. The insulator material can be selected according to the intended use and/or voltage to be used, for example.

In some embodiments the insulator comprises multiple layers. For instance, the inventors have discovered that the bulk of the insulator layer between the electrode and the body part approaching or toughing it may comprise glass but glass is not optimal as the insulators surface material. In the present context, optimal means an insulator material which best supports the creation of the electrosensory sensation. A glass insulator works much better if covered with a plastic film.

The inventive apparatus can be implemented such that its power consumption is low. For example, the power required to cause a sensory stimulus may be 1 mW, 5 mW or 10 mW or more. Power consumption can be measured on the basis of the electric power applied to the electrode when a human touches the apparatus surface or when a capacitively grounded 50 pF capacitor is connected to the apparatus surface.

The apparatus may comprise means for measuring the capacitance of the capacitive coupling being formed. The apparatus may further comprise means for adjusting the characteristics of the electric field, such as intensity or variation frequency, based on the obtained measurement information.

The inventive apparatus for sensory stimulation can be integrated as a part of some other apparatus or system. For instance, a prior art touch display can be complemented by apparatuses according to some embodiments of the present invention. This way it is possible to provide a touch display which produces a sensation of touch even if the display is not physically touched. Control components of the feedback system can be combined, or they may be arranged to exchange information with one another. An advantageous embodiment of the presently disclosed method and apparatus is a control device based on touch or proximity, such as a touch display that produces a feedback which can be sensed via the sense of touch.

In some embodiments of the invention, the local charge/field can be controlled by means of capacitive grounding. In various embodiments of the invention, it is possible to into account the fact that the dependence of the electric coupling on the insulated electrode, ie, capacitance, depends on several factors. The capacitance value affects the potential difference between the finger and electrode if the apparatus or subject (such as human) is not grounded, and their ground potential is determined via stray capacitances. Prior art implementations ignore control and processing of the distribution of capacitances and voltages, and some embodiments of the present invention aim at alleviating this separate problem.

For example, the invention differs from prior art solutions in that no touching or mechanical movement or vibration is required to generate the stimulus. Accordingly, the invention provides advantages over solutions which are based on, say, stroking the finger over the electrodes and on locally varying friction caused by the electric field. Furthermore, the various embodiments of the invention support solutions which are based not only on alternating current but also on direct current. Yet further, the inventive solution can be provided with a functionality to detect proximity and touch, whereby the same component can be used for input and output functions. In addition, various embodiments of the invention may utilize thick insulators, for example, which are mechanically stronger than thin insulators. Moreover, it has been discovered in connection with several embodiments of the invention that it is beneficial to use particular variation frequencies for the electric field, as they will enable smaller energy consumption in the generation of the stimulus.

In one embodiment the electrical input also comprises a high-frequency component having a frequency which is higher than the frequency of the low-frequency component and lower than 500 kHz. This embodiment may also comprise a modulator or other means for modulating the high-frequency component by the low-frequency component.

The electrical input to the one or more conducting electrodes has a peak-to-peak voltage of 750 to 100,000 Volts and the insulator should be dimensioned accordingly. In practical implementations with currently available materials the insulator thickness is typically between 0.1 mm and 50 mm.

In order to convey time-variant information, as opposed to a steady-state sensation, the apparatus may comprise means for modulating the electrical input according to the time-variant information.

A simple but effective implementation of the invention comprises precisely one conducting electrode for each spatially distinct area of the body member. There may be more than one conducting electrode such that each conducting electrode stimulates a spatially distinct area of one or more body members. The apparatus may comprise an enclosure which contains the high-voltage source which is common to all the several conducting electrodes and wherein the enclosure also contains means for conveying the electrical input to zero or more of the several conducting electrodes simultaneously. The inventive apparatus and/or the one or more conducting electrodes may be positioned such that that the body member most likely to be affected is part of a human hand. For example, five conducting electrodes under control of a common controller, may stimulate, at different times, zero to five fingertips in parallel. The five conducting electrodes thus convey five bits of information in parallel. The apparatus may be implemented as part of an input/output peripheral device connectable to a data processing equipment.

BRIEF DESCRIPTION OF THE DRAWINGS

In the following the invention will be described in greater detail by means of specific embodiments with reference to the attached drawings, in which.

DETAILED DESCRIPTION OF SPECIFIC EMBODIMENTS

FIGS. 1 through 15 relate to the operation and implementation of a capacitive electrosensory interface ("CEI") which can be employed in the inventive touch screen interface.

Figure 1:
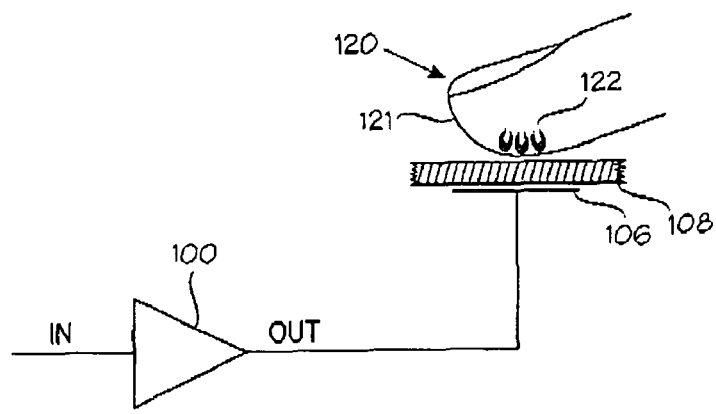
FIG. 1 illustrates the operating principle of a capacitive electrosensory interface ("CEI")

FIG. 1 illustrates the operating principle of the CEI. Reference numeral 100 denotes a high-voltage amplifier. The output of the high-voltage amplifier 100, denoted OUT, is coupled to an electrode 106 which is insulated against galvanic contact by an insulator 108 which comprises at least one insulation layer or member. Reference numeral 120 generally denotes a body member to be stimulated, such as a human finger. Human skin, which is denoted by reference numeral 121, is a relatively good insulator when dry, but the CEI provides a relatively good capacitive coupling between the electrode 106 and the body member 120. The capacitive coupling is virtually independent from skin conditions, such as moisture. The inventors' hypothesis is that the capacitive coupling between the electrode 106 and the body member 120 generates a pulsating Coulomb force. The pulsating Coulomb force stimulates vibration-sensitive receptors, mainly those called Pacinian corpuscles which reside under the outermost layer of skin in the ipodermis 121. The Pacinian corpuscles are denoted by reference numeral 122. They are shown schematically and greatly magnified.

The high-voltage amplifier 100 is driven by an input signal IN which results in a substantial portion of the energy content of the resulting Coulomb forces to reside in a frequency range to which the Pacinian corpuscles 122 are sensitive. For humans this frequency range is between 10 Hz and 1000 Hz, preferably between 50 Hz and 500 Hz and optimally between 100 Hz and 300 Hz, such as about 240 Hz. The frequency response of the Pacinian corpuscles is further discussed in connection with FIGS. 5 and 6.

It should be understood that, while "tactile" is frequently defined as relating to a sensation of touch or pressure, the electrosensory interface according to the present CEI, when properly dimensioned, is capable of creating a sensation of vibration to a body member even when the body member 120 does not actually touch the insulator 108 overlaying the electrode 106. This means that unless the electrode 106 and/or insulator 108 are very rigid, the pulsating Coulomb forces between the electrode 106 and body member 120 (particularly the Pacinian corpuscles 122) may cause some slight mechanical vibration of the electrode 106 and/or insulator 108, but the method and apparatus according to the CEI are capable of producing the electrosensory sensation independently of such mechanical vibration.

The high-voltage amplifier and the capacitive coupling over the insulator 108 are dimensioned such that the Pacinian corpuscles or other mechanoreceptors are stimulated and an electrosensory sensation (a sensation of apparent vibration) is produced. For this, the high-voltage amplifier 100 must be capable of generating an output of several hundred volts or even several kilovolts. In practice, the alternating current driven into the body member 120 has a very small magnitude and can be further reduced by using a low-frequency alternating current.

Figure 2:
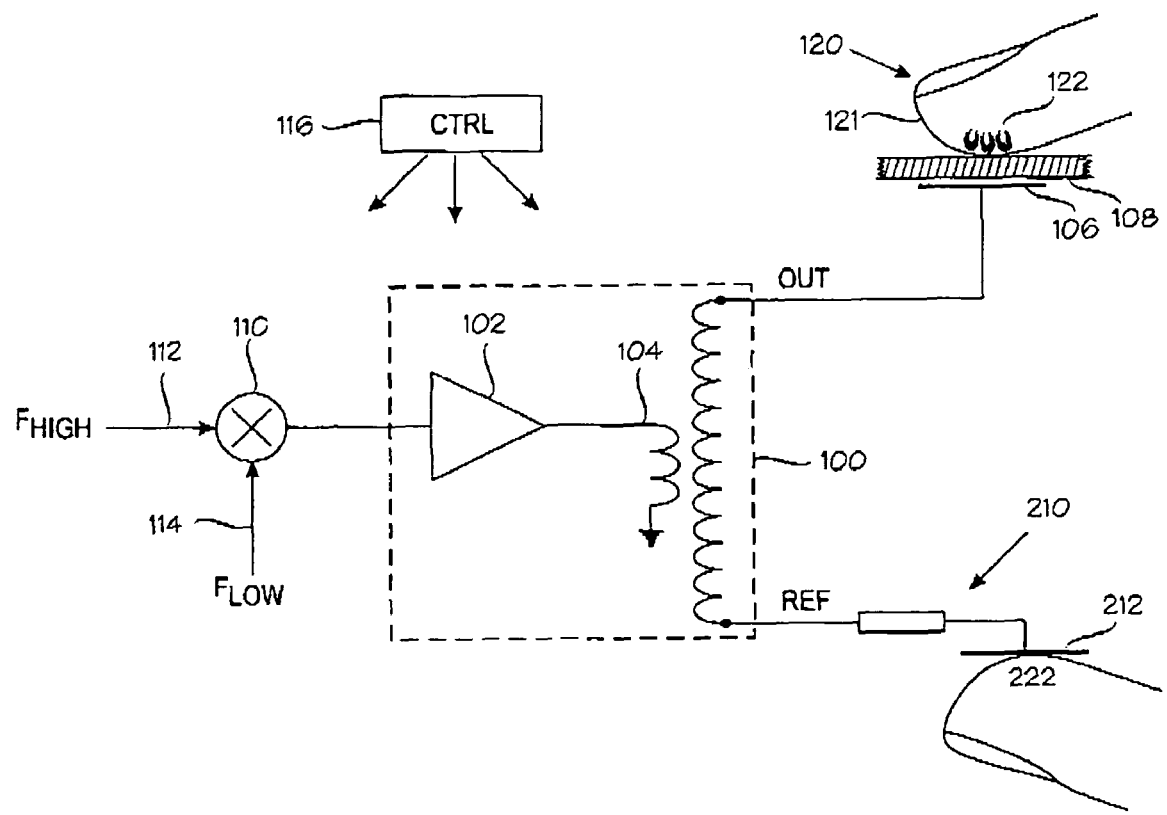
FIG. 2 illustrates an embodiment of the CEI.

FIG. 2 illustrates an apparatus which implements an illustrative embodiment of the present CEI. In this embodiment the high-voltage amplifier 100 is implemented as a current amplifier 102 followed by a high-voltage transformer 104. In the embodiment shown in FIG. 2, the secondary winding of the high-voltage transformer 104 is in a more or less flying configuration with respect to the remainder of the apparatus. The amplifier 100, 102 is driven with a modulated signal whose components are denoted by 112 and 114. The output of the high-voltage amplifier 100 is coupled to an electrode 106 which is insulated against galvanic contact by the insulator 108. Reference numeral 120 generally denotes a member to be stimulated, such as a human finger. Human skin, which is denoted by reference numeral 121, is a relatively good insulator when dry, but the CEI provides a relatively good capacitive coupling between the electrode 106 and the electrically conductive tissue underneath the skin surface 121. Mechanoreceptors, such as the Pacinian corpuscles 122, reside in this conductive tissue. In FIGS. 1 and 2, the Pacinian corpuscles 122 are shown schematically and greatly magnified.

A benefit of the capacitive coupling between the electrode 106 and the electrically conductive tissue underneath the skin surface, which is known as the Corneus Layer and which contains the Pacinian corpuscles 122, is that the capacitive coupling eliminates high local current densities to finger tissue, which would result from contact that is conductive at direct current.

It is beneficial, although not strictly necessary, to provide a grounding connection which helps to bring the subject to be stimulated, such as the user of the apparatus, closer to a well-defined (non-floating) potential with respect to the high-voltage section of the apparatus. In the embodiment shown in FIG. 2, the grounding connection, denoted by reference numeral 210, connects a reference point REF of the high-voltage section to a body part 222 which is different from the body part(s) 120 to be stimulated. In the embodiment shown in FIG. 2, the reference point REF is at one end of the secondary winding of the transformer 104, while the drive voltage for the electrode(s) 206A, 206B, 206C is obtained from the opposite end of the secondary winding.

In an illustrative implementation, the apparatus is a hand-held device which comprises a touch display activated by finger(s) 120. The grounding connection 210 terminates at a grounding electrode 212. An illustrative implementation of the grounding electrode 212 is one or more ground plates which are arranged such that they are conveniently touched one hand 222 of the user while the apparatus is manipulated by the other hand. The ground plate(s) may be positioned on the same side of the apparatus with the touch display and next to the touch display, or it/they may be positioned on adjacent or opposite side(s) from the side which comprises the touch display, depending on ergonomic considerations, for example.

In real-world apparatuses, the coupling 210 between the reference point REF and the non-stimulated body part 222 may be electrically complex. In addition, hand-held apparatuses typically lack a solid reference potential with respect to the surroundings. Accordingly, the term "grounding connection" does not require a connection to a solid-earth ground. Instead the grounding connection means any connection which helps to decrease the potential difference between the reference potential of the apparatus and a second body member distinct from the body member(s) to be stimulated. This definition does not rule out any capacitive parallel or stray elements, so long as the grounding connection 210 helps bring the user of the apparatus, along with the non-stimulated body part 222, to a potential which is reasonably well defined with respect to the high-voltage section of the apparatus. A capacitive grounding connection will be discussed in connection with FIG. 12. In the present context, the reasonably well-defined potential should be understood in view of the voltage OUT which drives the electrode(s) 206A, 206B, 206C. If the electrode drive voltage OUT is, say, 1000 V, a potential difference of, say, 100 V, between the user's body and the reference point REF may not be significant.

The non-capacitive coupling 210 between the reference point REF of the high-voltage section and the non-stimulated body part 222 greatly enhances the electrosensory stimulus experienced by the stimulated body part 120. Conversely, an equivalent electrosensory stimulus can be achieved with a much lower voltage and/or over a thicker insulator when the non-capacitive coupling 210 is being used.

The amplifier 100, 102 is driven with a high-frequency signal 112 which is modulated by a low-frequency signal 114 in a modulator 110. The frequency of the low-frequency signal 114 is such that the Pacinian corpuscles, which reside in the electrically conductive tissue underneath the skin surface, are responsive to that frequency. The frequency of the high-frequency signal 112 is preferably slightly above the hearing ability of humans, such as 18 to 25 kHz, more preferably between about 19 and 22 kHz. If the frequency of the signal 112 is within the audible range of humans, the apparatus and/or its drive circuit may produce distracting sounds. On the other hand, if the frequency of the signal 112 is far above the audible range of humans, the apparatus drives more current into the member 120. A frequency of about 20 kHz is advantageous in the sense that components designed for audio circuits can generally be used, while the 20 kHz frequency is inaudible to most humans. Experiments carried out by the inventors suggest that such modulation is not essential for the CEI. Use of a high-frequency signal with low-frequency modulation, such as the one schematically shown in FIG. 2, as opposed to a system which relies on the low-frequency signal alone, provides the benefit that the relatively high alternating voltage (a few hundred volts or a few kilovolts) can be generated with a relatively small transformer 104.

Terms like frequency or kHz should not be understood such that the high- or low-frequency signals 112, 114 are restricted to sinusoidal signals, and many other waveforms can be used, including square waves. The electrical components, such as the modulator 110, amplifier 102 and/or transformer 104 can be dimensioned such that harmonic overtones are suppressed. The inventors have discovered that pulses with durations of 4 ms (approximately one half-cycle of the low-frequency signal) or longer can be readily detected and with a practical insulator thickness the peak-to-peak voltage in the electrode 106 needs to be at least about 750 V. Unloaded peak-to-peak voltage measured in the electrode 106 should be in the range of approximately 750 V-100 kV. Near the lower limit of this voltage range, the insulator thickness may be 0.05-1 mm, for example. As material technology and nanotechnology develop, even thinner durable insulating surfaces may become available. This may also permit a reduction of the voltages used.

The elements of FIGS. 1 and 2 described so far produce a steady-state electrosensory sensation as long as the body member, such as the finger 120, is in the vicinity of the electrode 106. In order to convey useful information, the electrosensory sensation must be modulated. In some simple embodiments, such modulation can be implemented by positioning the electrode 106 such that useful information is conveyed by the fact that the finger 120 can sense the presence of the electrode 106. For example, the electrode 106 can be positioned over a switch, or in the vicinity of it, such that the switch can be detected without having to see it.

In other embodiments, such information-carrying modulation can be provided by electronically controlling one or more operating parameters of the inventive apparatus. The information-carrying modulation should not be confused with the modulation of the high-frequency signal 112 by the low-frequency signal 114, the purpose of which is to reduce the size of the trans-former 104. In the schematic drawing shown in FIG. 2, such information-carrying modulation is provided by controller 116, which controls one or more of the operating parameters of the inventive apparatus. For instance, the controller 116 may enable, disable or alter the frequency or amplitude of the high- or low-frequency signals 112, 114, the gain of the amplifier 102, or it may controllably enable or disable the power supply (not shown separately) or controllably break the circuit at any point.

Figure 3:
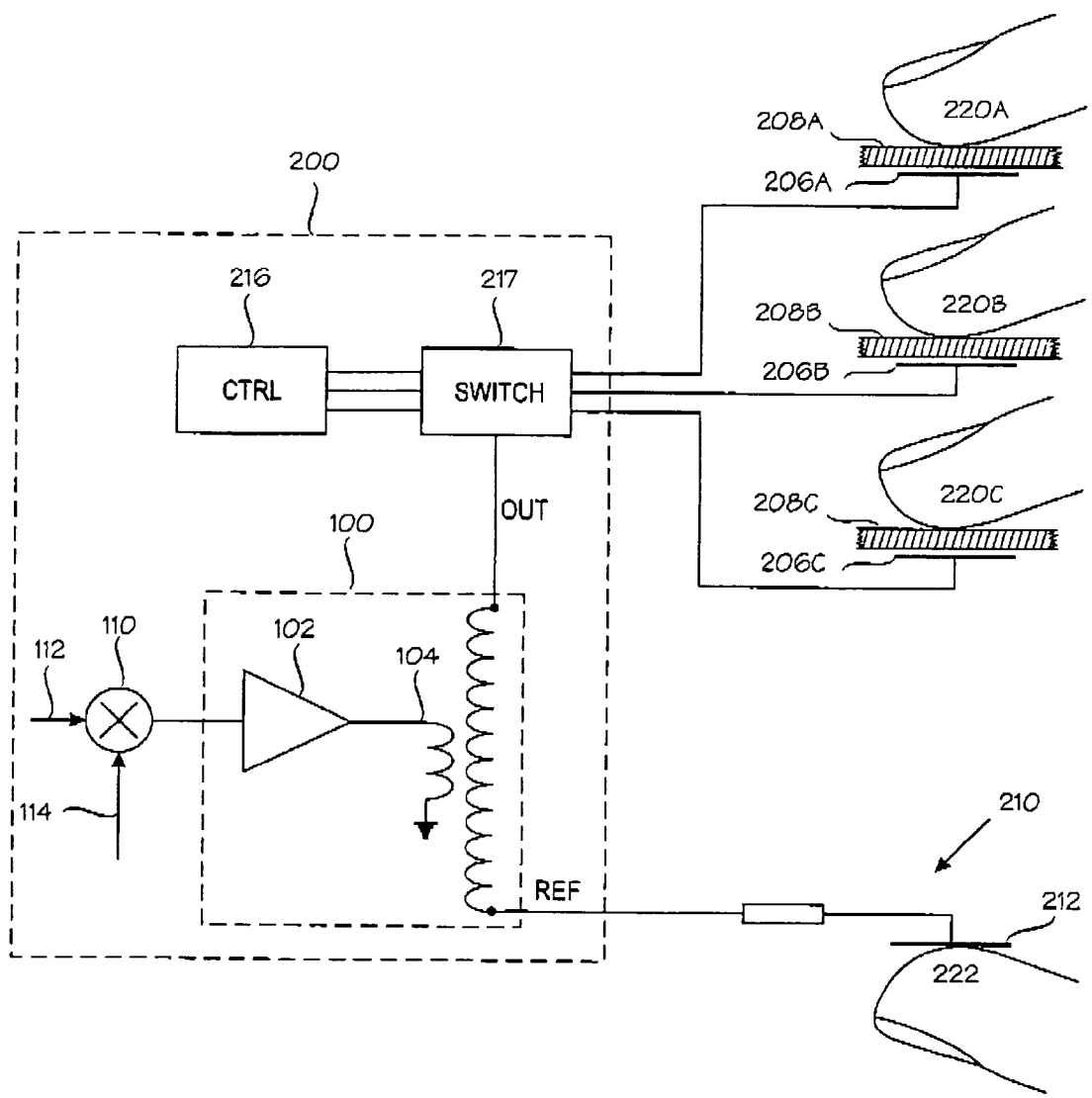
FIG. 3 shows an enhanced embodiment with multiple independently-controllable electrodes.

FIG. 3 shows an enhanced embodiment of the inventive apparatus with multiple independently-controllable electrodes. In FIG. 3, elements with reference numerals less than 200 have been described in connection with FIGS. 1 and 2, and a repeated description is omitted. This embodiment comprises multiple independently-controllable electrodes 206A, 206B and 206C, of which three are shown but this number is purely arbitrary. Reference numeral 216 denotes an implementation of a controller which controls a switch matrix 217 which provides the high-voltage signal OUT to the electrodes 206A, 206B and 206C under control of the controller 216. The controller 216 may be responsive to commands from an external device, such as a data processing equipment (not shown separately).

A benefit of the embodiment shown in FIG. 3 is that virtually all the drive circuitry, including the high-voltage amplifier 100, controller 216, and switch matrix 217, can be integrated into a common enclosure which is denoted by reference numeral 200. In this embodiment only the electrodes 206A, 206B and 206C and a single connecting wire for each electrode are outside the enclosure 200. As stated earlier, the electrodes need to be nothing more than simple conducting or semi-conducting plates covered by appropriate insulators. Therefore the enclosure 200 can be positioned in virtually any convenient position because the only elements external to it are very simple electrodes and connecting wires (and, in some implementations a power supply, not shown separately).

Some prior art systems provide direct stimulation of nerves via galvanic current conduction to the outermost layer of the skin. Because of the galvanic current conduction, such systems require two electrodes to stimulate an area of skin. In contrast to such prior art systems, the embodiment described in connection with FIG. 3 involves multiple electrodes 206A, 206B and 206C, but each electrode alone stimulates a distinct area of skin, or more precisely, the mechanoreceptors, including the Pacinian corpuscles underlying the outermost layers of skin. Therefore a configuration of n electrodes conveys n bits of information in parallel.

Figure 4:
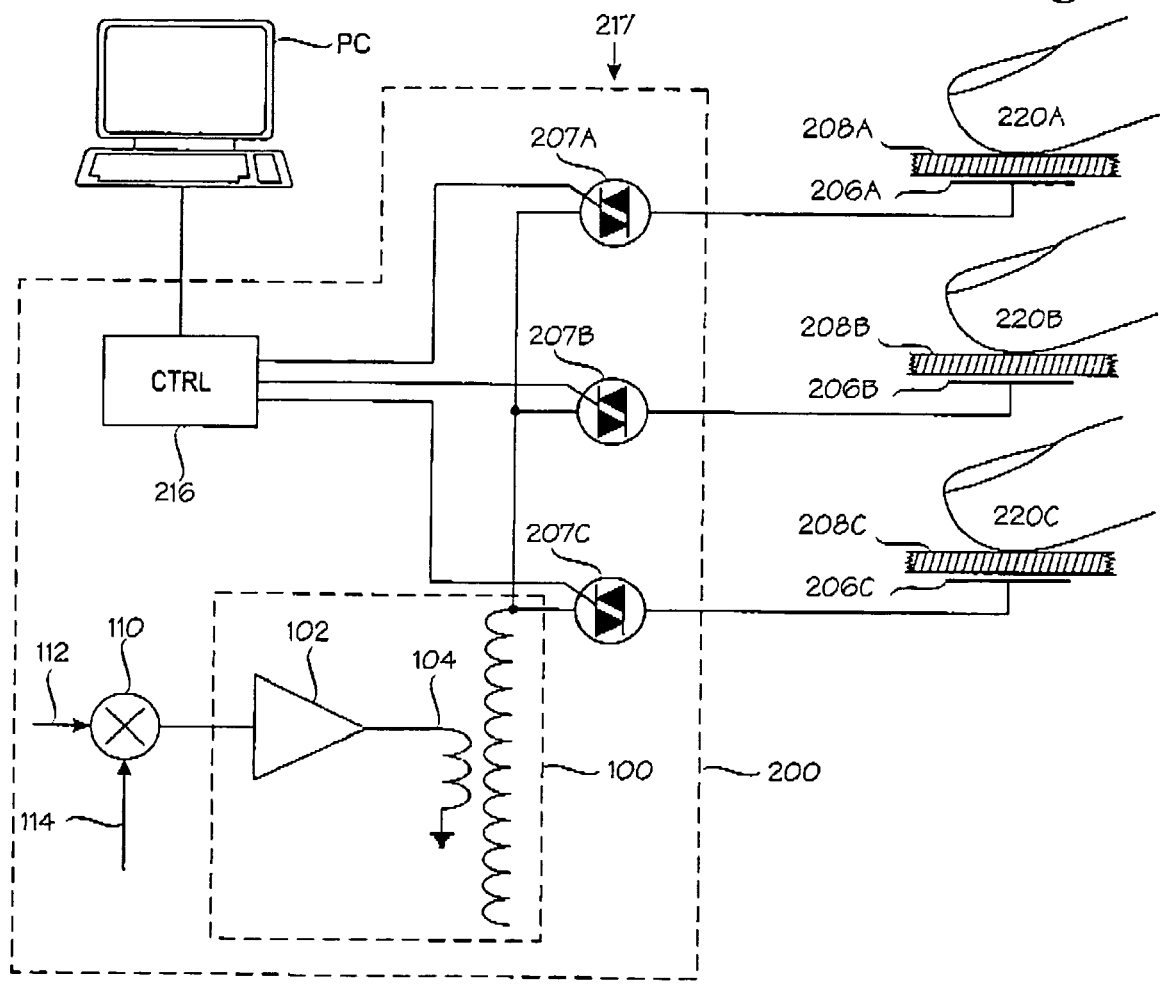
FIG. 4 shows a specific implementation of the embodiment shown in FIG. 3.

FIG. 4 shows a specific implementation of the embodiment shown in FIG. 3. In this implementation the switch matrix 217 comprises a bank of triacs 207A, 207B and 207C, but other types of semiconductor switches can be used, including semiconductor relays. Conventional electromechanical relays can be used as well. In this embodiment the switches (triacs) 207A, 207B and 207C are positioned logically after the transformer 104, ie, in the high-voltage circuitry. This implementation requires high-voltage switches (several hundred volts or several kilovolts) but it provides the benefit that the remainder of the circuitry, including the elements 100 through 114, can serve all of the electrodes 206A, 206B and 206C. As shown in FIG. 4, the controller 216 may be connectable to a data processing equipment, an example of which is shown here as a personal computer PC.

Figure 5:
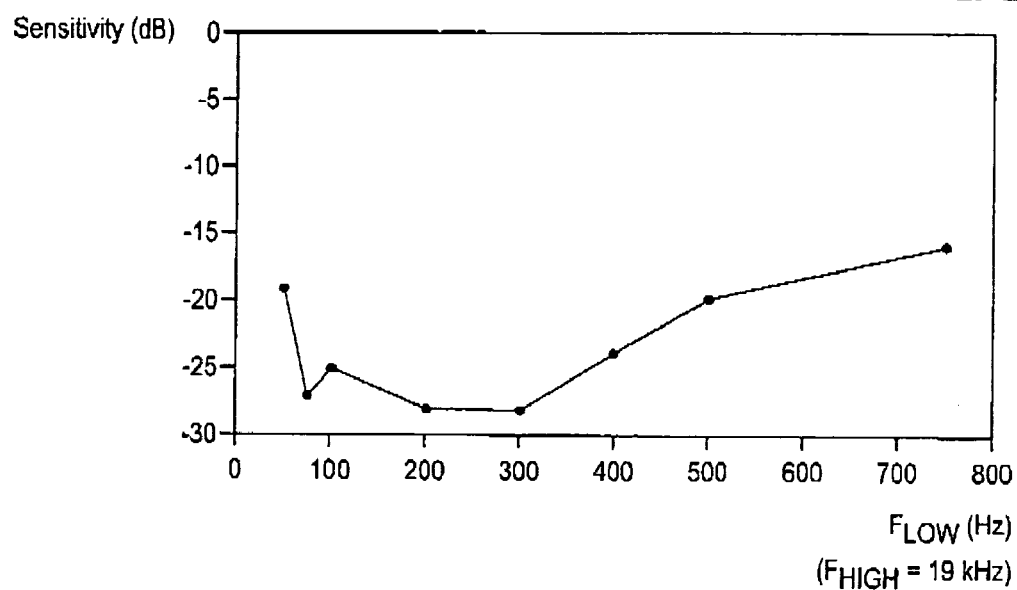
FIG. 5 is a graph which schematically illustrates the sensitivity of a test subject to sensations produced by the inventive capacitive electrosensory interface at various frequencies.

FIG. 5 is a graph which schematically illustrates the sensitivity of a randomly selected test subject to sensations produced by an apparatus substantially similar to the one shown in FIG. 2. The x-axis of the graph shows frequency of the low-frequency signal (item 114 in FIG. 2) multiplied by two, while the y-axis shows the amplitude required to detect an electrosensory stimulation. The amplitude scale is relative. The small dip at 75 Hz may be a measurement anomaly. The reason for placing the doubled low-frequency signal on the x-axis is that the Coulomb forces between the electrode 106 and the body member 120 have two intensity peaks for each cycle of a sinusoidal low-frequency signal, as will be schematically illustrated in connection with FIG. 6.

The relative sensitivity at various frequencies is remarkably similar to the one published in section 2.3.1 (FIG. 2.2) of Reference document 1. Reference document 1 relates to vibrotactile (mechanical) stimulation of skin, but the similarity of the frequency response shown in FIG. 5 to the one published in Reference 1 suggests that the present CEI operates such that the electrode 106 and the sensitive member 120 (see FIG. 1) form a capacitor over the insulator 108, and in that capacitor the oscillating Coulomb forces are converted to mechanical vibrations which are sensed by mechanoreceptors, including the Pacinian corpuscles. The inventors have also studied an alternative hypothesis wherein the Pacinian corpuscles are stimulated by current flowing through them, but this hypothesis does not explain the observations as well as the one which is based on Coulomb forces acting on the Pacinian corpuscles. However, the technical CEI described herein does not depend on the correctness of any particular hypothesis attempting to explain why the CEI operates the way it does.

Figure 6:
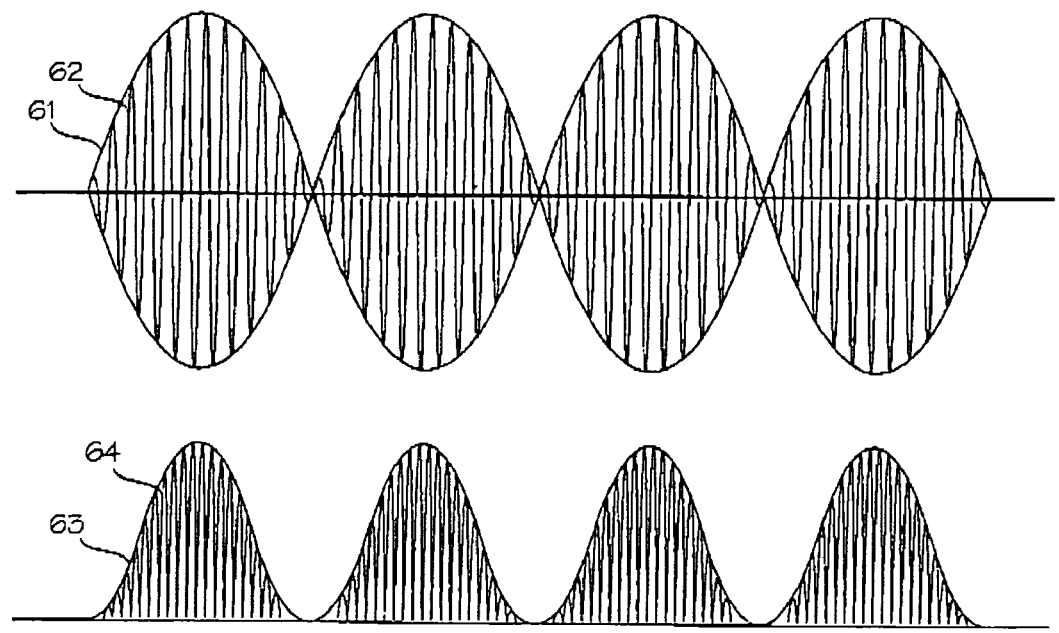
FIG. 6 is a graph which further clarifies the operating principle of the CEI.

FIG. 6 is a graph which further clarifies the operating principle of the CEI and the interpretation of frequencies in connection with the present CEI. Reference numeral 61 denotes the low-frequency input signal to the modulator 110 (shown as item 114 in FIG. 2). Reference numeral 62 denotes the output of the modulator, ie, the high-frequency input signal as modulated by the low-frequency input signal.

Reference numerals 63 and 64 denote the resulting Coulomb forces in the capacitive coupling between the electrode 106 and the body member 120 over the insulator 108. Because the two sides of the capacitive coupling have opposite charges, the Coulomb force between the two sides is always attractive and proportional to the square of the voltage. Reference numeral 63 denotes the actual Coulomb force while reference numeral 64 denotes its envelope. The envelope 64 is within the range of frequencies to which the Pacinian corpuscles are sensitive, but because the Coulomb force is always attractive, the envelope 64 has two peaks for each cycle of the modulator output signal 62, whereby a frequency-doubling effect is produced. Because the Coulomb force is proportional to the square of the voltage, any exemplary voltages disclosed herein should be interpreted as effective (RMS) values in case the voltages are not sinusoidal.

The statement that the two sides of the capacitive coupling have opposite charges whereby the Coulomb force is always attractive holds for a case in which the apparatus and the body member to be stimulated are at or near the same potential. High static charges can cause deviations from this ideal state of affairs, which is why some form of grounding connection between a reference potential of the high-voltage source and the body element other than the one(s) to be stimulated is recommended, as the grounding connection helps to lower the potential differences between the apparatus and its user.

The CEI can be implemented as part of an input/output peripheral device which is connectable to a data processing equipment. In such a configuration the data processing equipment can provide prompting and/or feedback via electrically-controllable electrosensory sensation.

Figure 7A:
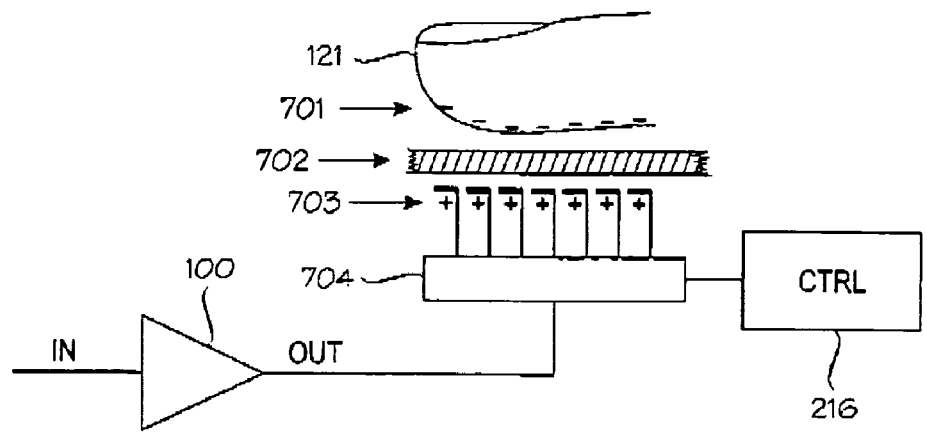
FIGS. 7A and 7B show an implementation of the CEI wherein the strength of the capacitive coupling is adjusted by electrode movement.
Figure 7B:
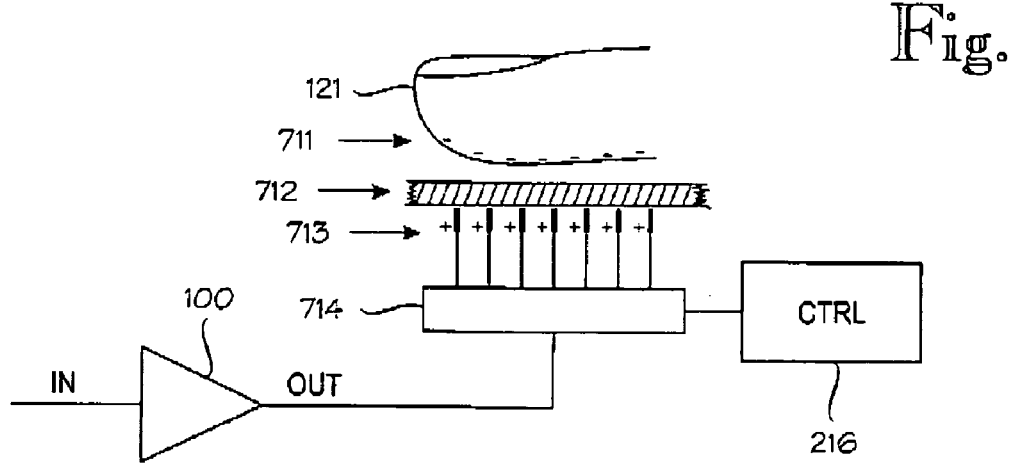

FIGS. 7A and 7B show implementations of the CEI wherein the strength of the capacitive coupling is adjusted by electrode movement. Generation of the electric field, and its variation as necessary, is effected via a set of electrodes 704 which comprises individual electrodes 703. The individual electrodes 703 are preferably individually controllable, wherein the controlling of an electrode affects its orientation and/or protrusion. FIG. 7A shows an implementation wherein a group of electrodes 703 are oriented, via the output signal from the controller 216, such that the electrodes 703 collectively form a plane under the insulator 702. In this situation the high-voltage current (DC or AC) from the high-voltage amplifier 100 to the electrodes 703 generates an opposite-signed charge of sufficient strength to a body member (eg the finger 120) in close proximity to the apparatus. A capacitive coupling between the body member and the apparatus is formed over the insulator 702, which may give rise to a sensory stimulus.

FIG. 7B shows the same apparatus shown in FIG. 7A, but in this case the strength of the capacitive coupling generated with the current from the high-voltage amplifier 100 is minimized by orienting the electrodes (now shown by reference numeral 714) such that they do not form a plane under the insulator 702. In some implementations of the present invention, the electric field alternating with a low frequency can be generated by alternating the state of the apparatus between the two states shown in FIGS. 7A and 7B. The frequency of the state alternation can be in the order of several hundred, eg 200 to 300 full cycles per second.

Figure 8:
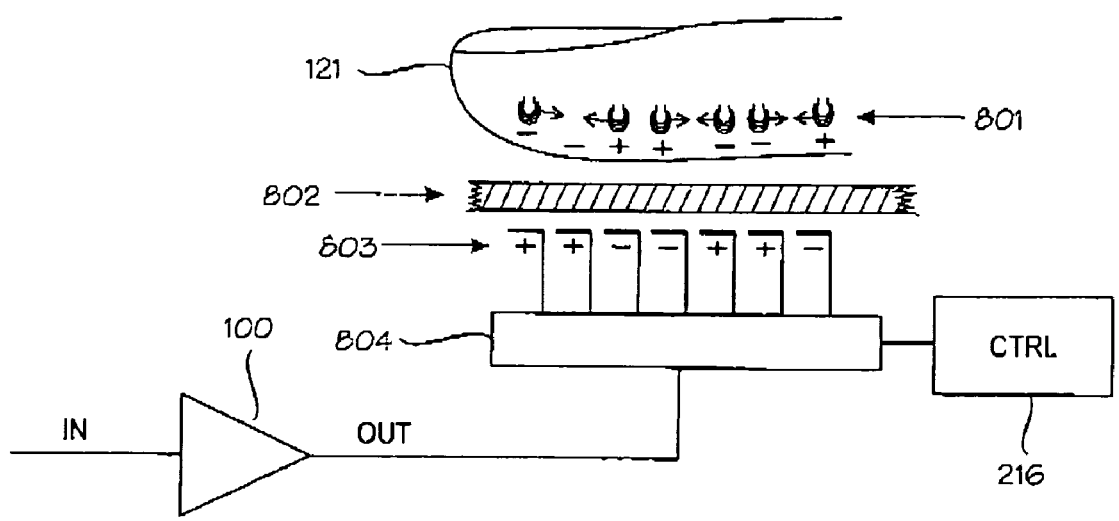
FIG. 8 shows an implementation of the CEI wherein the charges of different electrodes have opposite signs.

FIG. 8 shows an implementation of the CEI wherein the individual electrodes 803 in the set of electrodes 804 may have charges of opposite signs. The charges of individual electrodes 803 may be adjusted and controlled via the controller 216. The individual electrodes 803 may be separated by insulator elements 806, so as the prevent sparking or shorting between the electrodes. The capacitive coupling between the CEI and the body member proximate to it may give rise to areas having charges with opposite signs 801. Such opposing charges are mutually attractive to one another. Hence it is possible that Coulomb forces stimulating the Pacinian corpuscles may be generated not only between the CEI and the body member but between infinitesimal areas within the body member itself.

Figure 9:
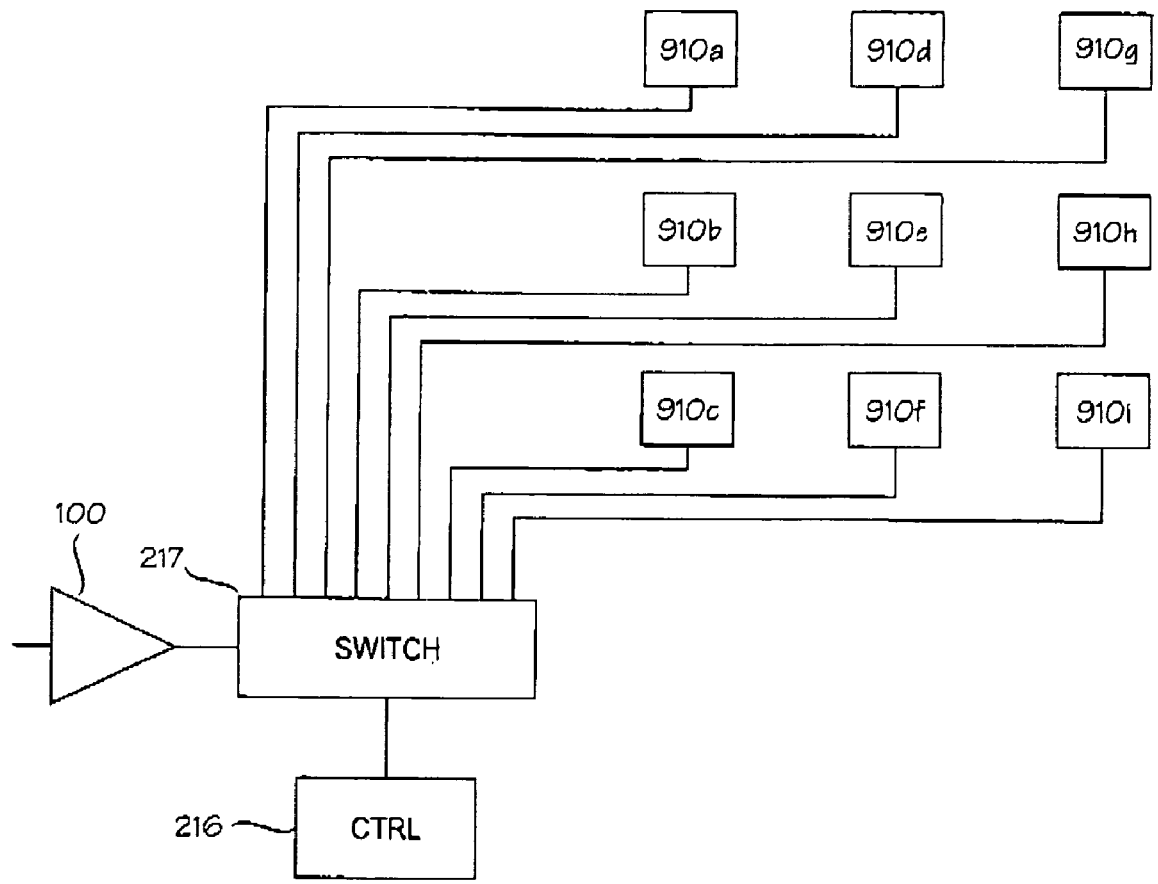
FIG. 9 shows an implementation of the CEI wherein a group of electrodes are organized in the form of a matrix.

FIG. 9 shows an implementation of the CEI wherein a group of individually controllable electrodes 910a through 910i are organized in the form of a matrix. Such a matrix can be integrated into a touch screen device, for example. Since the CEI described above does not require direct connection (touching) between the CEI and a body member of its user, the electrodes of the CEI apparatus can be positioned behind the touch screen, wherein "behind" means the side of the touch screen opposite to the side facing the user during normal operation. Alternatively, the electrodes can be very thin and/or transparent, whereby the electrodes can overlay the touch screen on the side normally facing the user. The electric charges, which are conducted from the high-voltage amplifier 100 to the electrodes 910a through 910i via the switch array 217, may all have similar signs or the charges conducted to different electrodes may have different signs, as illustrated in connection with FIG. 8. For instance, the controller 216 may control the switches in the switch array individually, or certain groups may form commonly-controllable groups. The surface of an individual electrode and/or its associated insulator can be specified according to the intended range of operations or applications. The minimum practical area is about 0.01 cm$^2$, while the practical maximum is roughly equal to the size of a human hand. It is expected that surface areas between 0.1 and 1 cm$^2$ will be found most usable in practice.

The matrix of electrodes 910a through 910i and the switch array 217 provide a spatial variation of the electrosensory stimulation. In other words, the sensory stimulation provided to the user depends on the location of the user's body member, such as a finger, proximate to the CEI apparatus which is integrated to the inventive touch screen. The spatially varying sensory stimulation provides the user with an indication of the layout of the touch-sensitive areas of the touch screen interface.

In addition to the spatially varying sensory stimulation, the controller 216 may direct the switch array 217 to produce a temporally varying (time-dependent) electrosensory stimulation, which can be used for a wide variety of useful effects. For instance, the temporally varying electrosensory stimulation can be used to indicate a detected activation of a touch-sensitive area ("key press"). This embodiment address a common problem associated with prior art touch screen devices, namely the fact that a detection of a key press produces no tactile feedback. Prior art application-level programs used via touch screen devices may provide visual or aural feedback, but such types of feedback exhibit the various problems described earlier. In addition, production of the visual or aural feedback from the application-level program causes a burden on the programming and execution of those programs. In some implementations of the invention, an interface-level or driver-level program provides a tactile feedback from a detected activation of a touch-sensitive area by using the temporally and spatially variant electrosensory stimulation, and such interface-level or driver-level programs can be used by any application-level programs. For example, the application-level programs can be coupled to the inventive touch screen interface via an application programming interface ("API") whose set of available functions includes the feedback generation described above.

The temporally and spatially variant electrosensory stimulation can also be used to change the layout of the touch-sensitive areas "on the fly". In hindsight, this operation may be considered roughly analogous to changing the keyboard or keypad layout depending on the application program or user interface screen currently executed. However, when prior art touch screen devices change keyboard or keypad layout on the fly, the new layout must be somehow indicated to the user, and this normally requires that the user sees the touch screen device.

Some embodiments of the inventive touch screen device eliminate the need to see the touch screen device, assuming that the layout of the touch-sensitive areas is sufficiently simple. For instance, up to about two dozen different "key legends" can be indicated to the user by providing different patterns for the temporally and spatially variant electrosensory stimulation. As used herein, the expression "key legend" refers to the fact that prior art touch screen devices, which produce no tactile feedback, normally produce visual cues, and these are commonly called "legends". In some embodiments of the present invention, the function of the key legends can be provided via different patterns. For instance, the following patterns can be identified with one fingertip: pulses with low, medium or high repetition rate; sweeps to left, right, up or down, each with a few different repetition rates; rotations clockwise or anti-clockwise, each with a few different repetition rates.

From the above, it is evident that the inventive electrosensory interface can produce a large number of different touch-sensitive areas, each with a distinct "feel" (technically: a different pattern for the temporal and spatial variation of the electrosensory stimulus). Hence the screen section of a conventional touch screen is not absolutely needed in connection with the present invention, and the term touch device interface should be interpreted as an interface de vice which, among other things, is suitable for applications commonly associated with touch screen devices, although the presence of the screen is not mandatory.

Moreover, the strength of the capacitive coupling between the inventive CEI and a body member of its user (or the capacitive coupling between an individual electrode or a group of electrodes and the user's body member) can be determined by direct or indirect measurements. This measurement information can be utilized in various ways. For instance, the strength of the capacitive coupling can indicate the body member's proximity to the electrode, or it can indicate touching the electrode by the body member. Such measurement functionality can be provided by a dedicated measurement unit (not shown) or it can be integrated into one of the blocks described earlier, such as the switch matrix 217. The switch matrix 217 (or the optional dedicated measurement unit) can send the measurement information to the controller 216 which can utilize it to vary the electric fields generated by the electrodes, by varying the voltage or frequency. In addition or alternatively the controller 216 may forward the measurement information, or some information processed from it, to a data processing equipment, such as the personal computer PC shown in FIG. 4.

Yet further two or more inventive touch device interfaces can be interconnected via some communication network(s) and data processing equipment. In such an arrangement, the electrosensory stimulation provided to the users of the touch screen devices may be based on some function of all users' contribution to the proximity to their respective devices. In one illustrative example, such an interconnection of two (or more) touch screen devices can provide their users with tactile feedback whose strength depends on the sum of the areas of hands touch the touch-sensitive areas. This technique simulates a handshake whose strength reflects the sum of hand pressure exerted by both (or all) users. In another illustrative example, a music teacher might "sense" how a remotely located student presses the keys of a simulated piano keyboard.

Figure 10:
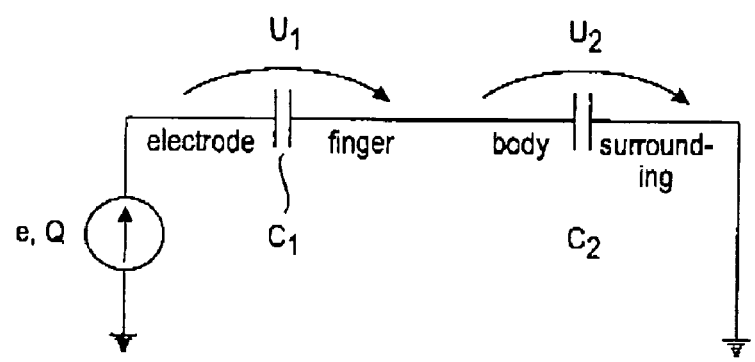
FIG. 10 illustrates distribution of an electric field-generating potential in capacitive couplings when the apparatus is grounded.

FIGS. 10 through 13 are equivalent circuits (theoretical models) which may be useful in dimensioning the parameters of the capacitive coupling. FIG. 10 illustrates distribution of an electric field-generating potential in capacitive couplings when the apparatus is grounded. The underlying theory is omitted here, and it suffices to say that in the arrangement shown in FIG. 10, the drive voltage e of an electrode is divided based on the ratio of capacitances C1 and C2, wherein C1 is the capacitance between the finger and the electrode and C2 is the stray capacitance of the user. The electric field experienced by the finger is caused by voltage U1:

$$U_1 = \frac{C_1}{C_1 + C_2} e$$

This voltage is lower than the drive voltage e from the voltage source. In a general case the reference potential of the apparatus may be floating, as will be shown in FIG. 11. This arrangement further decreases the electric field directed to the body member, such as finger.

Figure 12:
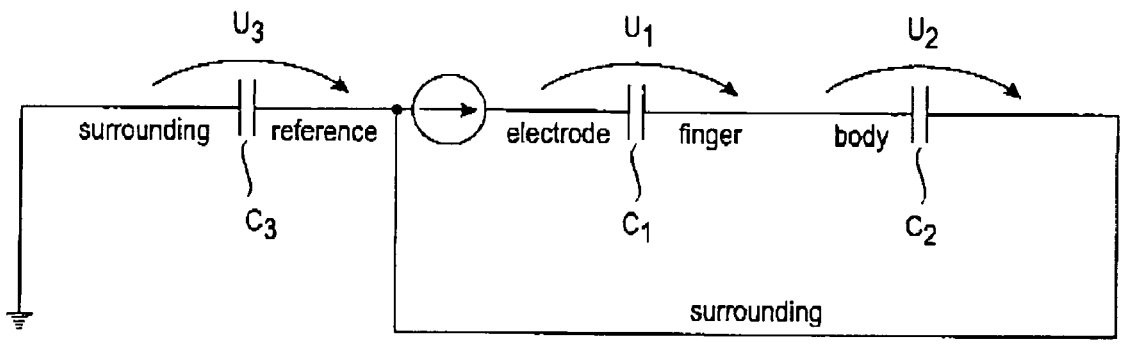
FIG. 12 illustrates distribution of an electric field-generating potential in capacitive couplings when the apparatus is floating and the user is sufficiently close to the apparatus and capacitively grounded to the ground (reference) potential of the apparatus.

For these reasons some embodiments of the invention aim at keeping the capacitance C1 low in comparison to that of C2. At least capacitance C1 should not be significantly higher than C2. Some embodiments aim at adjusting or controlling C2, for instance by coupling the reference potential of the apparatus back to the user, as shown in FIG. 12.

Further analysis of the actual value of capacitance C1 shows that it can be treated as a capacitance consisting of three series-coupled partial capacitances: $C_i$ of the insulator material, $C_a$ of the air gap between insulator and finger, and $C_s$ formed by the outmost skin layer that is electrically insulating the inner, conducting tissue from the environment. Each partial capacitance is given by:

$$C = \varepsilon \frac{S}{d}$$

Herein, $\varepsilon$ is the permittivity (dielectric constant) of the insulating material, S is the (effective) surface area and d is the distance between the surfaces of the capacitor. In a series arrangement of capacitances, the smallest one of the individual capacitances dominates the overall value of the total capacitance C1. When the body member does not touch the surface of the insulated electrode but only approaches it, the capacitive coupling is weak. Thus the value of C1 is small and mainly determined by the air gap, $C_a$. When the body member touches the surface, the effective air gap is small (approximately the height ridges of the fingerprint profile on the skin surface). As capacitance is inversely proportional to the distance of the conducting surfaces forming the capacitor, corresponding $C_a$ obtains a high value, and the value of C1 is determined by $C_i$ and $C_s$. Thus the effectiveness of the electrosensory stimulus generation can be enhanced by appropriate selection of insulator material, particularly in terms of thickness and dielectric properties. For instance, selecting a material with a relatively high dielectric constant for the insulator reduces the electric field in the material but increases the electric field strength in the air gap and skin.

Furthermore, in applications where the surface is likely to be touched while the electrosensory stimulation or response is given, the effectiveness of the electrosensory stimulus generation can be enhanced by optimal selection of the material that will be touched by the body member. This is particularly significant in connection with insulators which are good volume insulators (insulators in the direction of the surface's normal) but less so in the direction along the surface.

An insulator's insulation capability along the surface may be negatively affected by surface impurities or moisture which have a negative effect on the apparent strength of the sensation felt by the body member to be stimulated. For instance, glass is generally considered a good insulator, but its surface tends to collect a thin sheet of moisture from the air. If the electrode of the CEI is insulated with glass, the electrosensory effect is felt in close proximity (when there is still an air gap between body member and the glass surface). However, when the glass surface is touched, even lightly, the electrosensory tends to weaken or disappear altogether. Coating the outer insulating surface with a material having a low surface conductance remedies such problems. The inventors speculate that if the surface having some surface conductivity is touched, it is the conductive layer on the surface that experiences the coulomb force rather than the body member touching the surface. Instead the touching body member acts as a kind of grounding for the conductive surface layer, for example via the stray capacitance of the body.

Figure 11:
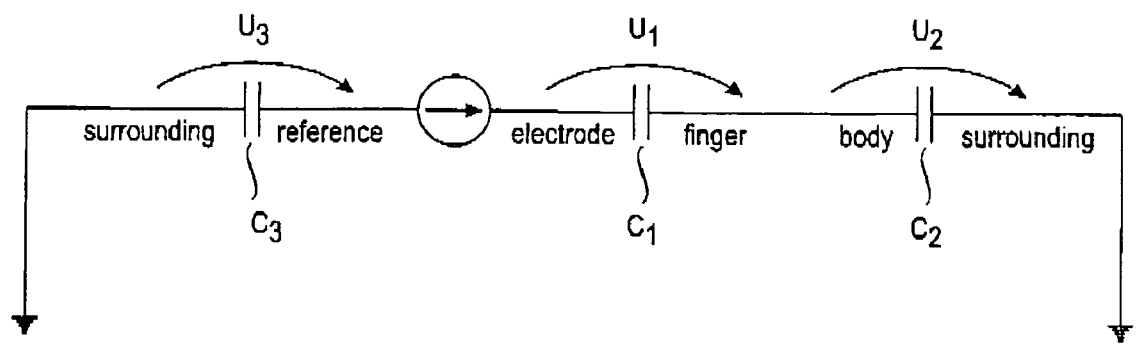
FIG. 11 illustrates distribution of an electric field-generating potential in capacitive couplings when the apparatus is floating (not grounded)

Instead of the measures described in connection with FIGS. 10 through 12, or in addition to such measures, stray capacitances can be controlled by arrangements in which several electrodes are used to generate potential differences among different areas of the touch screen surface. By way of example, this technique can be implemented by arranging the touch-sensitive surface of a hand-held device (eg the top side of the device) to a first potential, while the opposite side is arranged to a second potential, wherein the two different potentials can be the positive and negative poles of the device. Alternatively, a first surface area can be the electric ground (reference potential), while a second surface area is charged to a high potential.

Moreover, within the constraints imposed by the insulator layer(s), it is possible to form minuscule areas of different potentials, such as potentials with opposite signs or widely different magnitudes, wherein the areas are small enough that the user's body member, such as finger, is simultaneously subjected to the electric fields from several areas with different potentials.

Figure 13:
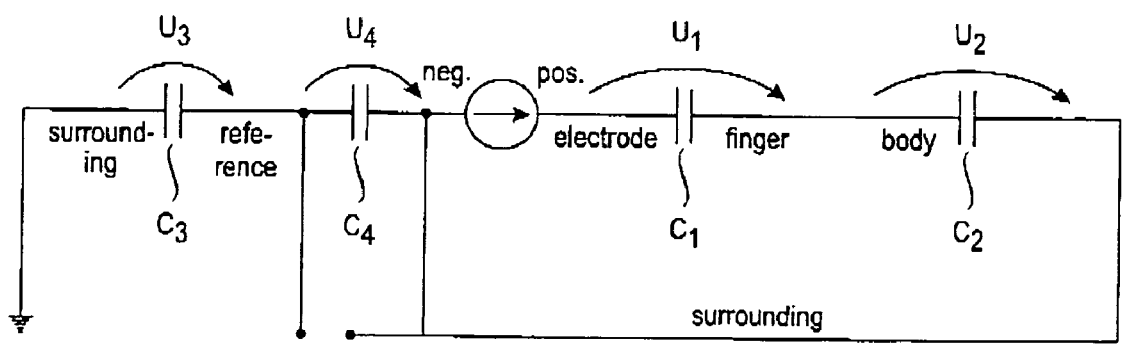
FIG. 13 shows an arrangement wherein capacitive couplings are utilized to detect touching.

FIG. 13 shows an embodiment in which the capacitive coupling is utilized to detect touching or approaching by the user's body member, such as finger. A detected touching or approaching by the user's body member can be passed as an input to a data processing device. In the embodiment shown in FIG. 13, the voltage source is floating. A floating voltage source can be implemented, via inductive or capacitive coupling and/or with break-before-make switches. A secondary winding of a transformer is an example of a simple yet effective floating voltage source. By measuring the voltage U4, it is possible to detect a change in the value(s) of capacitance(s) C1 and/or C2. Assuming that the floating voltage source is a secondary winding of a transformer, the change in capacitance(s) can be detected on the primary side as well, for example as a change in load impedance. Such a change in capacitance(s) serves as an indication of a touching or approaching body member.

In one implementation, the apparatus is arranged to utilize such indication of the touching or approaching body member such that the apparatus uses a first (lower) voltage to detect the touching or approaching by the body member and a second (higher) voltage to provide feedback to the user. For instance, such feedback can indicate any of the following: the outline of the/each touch-sensitive area, a detection of the touching or approaching body member by the apparatus, the significance of (the act to be initiated by) the touch-sensitive area, or any other information processed by the application program and which is potentially useful to the user.

Figure 14:
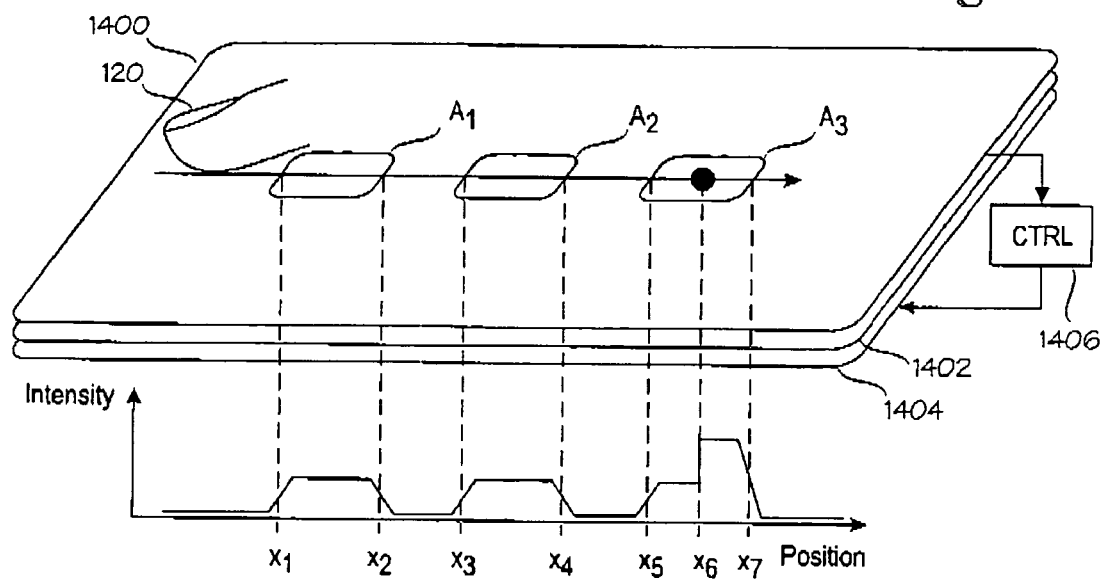
FIGS. 14 and 15 illustrate embodiments in which a single electrode and temporal variations in the intensity of the electrosensory stimulus can be used to create illusions of a textured touch screen surface.

FIG. 14 schematically illustrates an embodiment in which a single electrode and temporal variations in the intensity of the electrosensory stimulus can be used to create illusions of a textured touch screen surface. Reference numeral 1400 denotes a touch-sensitive screen which, for the purposes of describing the present embodiment, comprises three touch-sensitive areas $A_1$, $A_2$ and $A_3$. The approaching or touching by the touch-sensitive areas $A_1$, $A_2$ and $A_3$ of a user's finger 120 is detected by a controller 1406.

According to an embodiment of the invention, a conventional touch-sensitive screen 1400 can be complemented by an interface device according to the invention. Reference numeral 1404 denotes an electrode which is an implementation of the electrodes described in connection with previously-described embodiments, such as the electrode 106 described in connection with FIGS. 1 and 2. A supplemental insulator 1402 may be positioned between the touch-sensitive screen 1400 and the inventive electrode 1404, in case the touch-sensitive screen 1400 itself fails to provide sufficient insulation.

In addition to conventional touch-screen functionality, namely detection of approaching or touching by the touch-sensitive areas by the user's finger, the controller 1406 uses information of the position of the finger 120 to temporally vary the intensity of the electrosensory stimulation invoked by the electrode 1404 on the finger 120. Although the intensity of the electrosensory stimulation is varied over time, time is not an independent variable in the present embodiment. Instead, timing of the temporal variations is a function of the position of the finger 120 relative to the touch-sensitive areas (here; $A_1$, $A_2$ and $A_3$). Thus it is more accurate to say that the present embodiment is operable to cause variations in the intensity of the electrosensory stimulation invoked by the electrode 1404 on the finger 120, wherein the variations are based on the position of the finger 120 relative to the touch-sensitive areas.

The bottom side of FIG. 14 illustrates this functionality. The three touch-sensitive area $A_1$, $A_2$ and $A_3$ are demarcated by respective x coordinate pairs $\{x_1, x_2\}$, $\{x_3, x_4\}$ and $\{x_5, x_7\}$. Processing in the y direction is analogous and a detailed description is omitted. The controller 1406 does not sense the presence of the finger, or senses the finger as inactive, as long as the finger is to the left of any of the touch-sensitive areas $A_1$, $A_2$ and $A_3$. In this example the controller 1406 responds by applying a low-intensity signal to the electrode 1404. As soon as the finger 120 crosses the x coordinate value $x_1$, the controller 1406 detects the finger over the first touch-sensitive area $A_1$ and starts to apply a medium-intensity signal to the electrode 1404. Between the areas $A_1$ and $A_2$ (between x coordinates $x_2$ and $x_3$), the controller again applies a low-intensity signal to the electrode 1404. The second touch-sensitive area $A_2$ is processed similarly to the first touch-sensitive area $A_1$, but the third touch-sensitive area $A_3$ is processed somewhat differently. As soon as the controller 1406 detects the finger 120 above or in close proximity to the area $A_3$, it begins to apply the medium-intensity signal to the electrode 1404, similarly to areas $A_1$ and $A_2$. But the user decides to press the touch screen 1400 at a point x6 within the third area $A_3$. The controller 1406 detects the finger press (activation of the function assigned to the area $A_3$) and responds by applying a high-intensity signal to the electrode 1404.

Thus the embodiment shown in FIG. 14 can provide the user with a tactile feedback which creates an illusion of a textures surface, although only a single electrode 1404 was used to create the electrosensory stimulus. A residual problem is, however, that the user has to memorize the significance of the several touch-sensitive areas or obtain visual or aural information on their significance.

Figure 15:
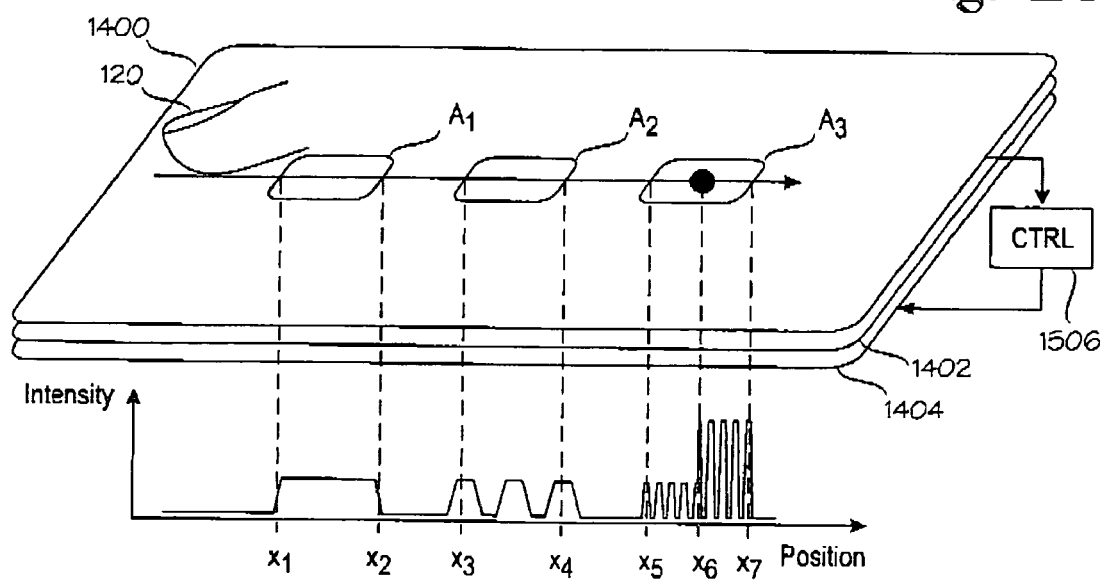

FIG. 15 shows a further enhanced embodiment from the one described in connection with FIG. 14. The embodiment shown in FIG. 15 uses different temporal variations of the intensity of the electrosensory stimulus, Wherein the different temporal variations provide the user with a tactile feedback indicating the significance of the touch-sensitive areas.

The operation of the embodiment shown in FIG. 14 differs from the one described in connection with FIG. 14 in that the controller, here denoted by reference numeral 1506, applies different temporal variations to the intensity of the signal to the electrode 1404. In this example, the first touch-sensitive area $A_1$ is processed similarly to the preceding embodiment, or in other words, the intensity of the electrosensory stimulus depends only on the presence of the finger 120 in close proximity to the area $A_1$. But in close proximity to areas $A_2$ and $A_3$, the controller 1506 also applies temporal variations to the intensity of the electrosensory stimulus. For example the significance (coarsely analogous with a displayed legend) of area $A_2$ is indicated by a pulsed electrosensory stimulus at a first (low) repetition rate, while the significance of area $A_3$ is indicated by a pulsed electrosensory stimulus at a second (higher) repetition rate. In an illustrative example, the three touch-sensitive areas $A_1$, $A_2$ and $A_3$ can invoke the three functions in a yes/no/cancel-type user interface, wherein the user can sense the positions of the user interface keys (here: the three touch-sensitive areas) and the indication of an accepted input only via tactile feedback. In other words, the user needs no visual or aural information on the positions of the touch-sensitive areas or on the selected function. The embodiment described in connection with FIG. 15 is particularly attractive in car navigators or the like, which should not require visual attention from their users.

In the embodiments shown in FIGS. 14 and 15, when the user's finger 120 has selected the function assigned to area $A_3$ and the controller CTRL 1406, 1506 generates the high-intensity electrosensory stimulus via the electrode 1404, the high-intensity stimulus is sensed via any of the areas $A_1$, $A_2$ and $A_3$. In other words, if one finger of the user presses the area $A_3$, other finger(s) in close proximity to the other areas $A_2$ and/or $A_3$ will also sense the high-intensity stimulus. In cases where this is not desirable, the embodiments shown in FIGS. 14 and 15 can be combined with the multi-electrode embodiment disclosed in connection with FIG. 9, such that the signal to each of several electrodes (shown in FIG. 9 as items 910a through 910i) is controlled individually.

It is readily apparent to a person skilled in the art that, as the technology advances, the inventive concept can be implemented in various ways. The invention and its embodiments are not limited to the examples described above but may vary within the scope of the claims.

REFERENCES

1. Gunther, Eric: "*Skinscape: A Tool for Composition in the Tactile Modality*" Masters thesis, Massachusetts Institute of Technology 2001, available on the Internet address: http://mf.media.mit.edu/pubs/thesis/guntherMS.pdf

We claim:

1. An apparatus for producing an electrosensory sensation to at least one body member to be stimulated, the apparatus comprising:
    one or more conducting electrodes, each conducting electrode being provided with an insulator wherein, when the at least one body member to be stimulated being proximate to the conducting electrode, the insulator prevents flow of direct current from the conducting electrode to the at least one body member to be stimulated and a capacitive coupling over the insulator being formed between the conducting electrode and the at least one body member to be stimulated;
    a high-voltage source for applying an electrical input to the one or more conducting electrodes, the electrical input comprises a low-frequency component in a frequency range between 10 Hz and 1000 Hz,
    the capacitive coupling and electrical input being dimensioned to produce an electrosensory sensation, and
    the electrosensory sensation is produced independently of any mechanical vibration of the one or more conducting electrodes or the insulator and independently of movement of the at least one body member to the one or more conducting electrodes.

2. The apparatus according to claim 1, wherein at least one of the one or more conducting electrodes is positioned such that that the at least one body member to be stimulated most likely to be affected is part of a human hand.

3. The apparatus according to claim 1, wherein the apparatus comprises one conducting electrode for each spatially distinct area of the at least one body member to be stimulated.

4. The apparatus according to claim 1, wherein the apparatus comprises one conducting electrode for each of several spatially distinct areas of the at least one body member to be stimulated.

5. The apparatus according to claim 1, further comprising an enclosure which contains the high-voltage source which is common to all the several conducting electrodes and wherein the enclosure also contains means for conveying the electrical input to zero or more of the several conducting electrodes simultaneously, under control of a common controller.

6. The apparatus according to claim 5, wherein the apparatus is part of an input/output peripheral device connectable to a data processing equipment.

7. The apparatus according to claim 1, wherein the electrical input also comprises a high-frequency component having a frequency which is higher than the frequency of the low-frequency component and lower than 500 kHz.

8. The apparatus according to claim 1, comprising means for modulating the high-frequency component by the low-frequency component.

9. The apparatus according to claim 1, wherein the electrical input to the one or more conducting electrodes has a peak-to-peak voltage of 500 to 100,000 Volts.

10. The apparatus according to claim 1, wherein the insulator has a thickness between 0.1 mm and 50 mm.

11. A method for causing an electrosensory sensation to at least one body member to be stimulated, the method comprising:
    providing one or more conducting electrodes, each conducting electrode being provided with an insulator wherein, when the at least one body member to be stimulated being proximate to the conducting electrode, the insulator prevents flow of direct current from the conducting electrode to the at least one body member to be stimulated and a capacitive coupling over the insulator being formed between the conducting electrode and the at least one body member to be stimulated;

providing a high-voltage source for applying an electrical input to the one or more conducting electrodes, wherein the electrical input comprises a low-frequency component in a frequency range between 10 Hz and 500 Hz, the capacitive coupling and electrical input being dimensioned to produce an electrosensory sensation, and the electrosensory sensation being produced independently of any mechanical vibration of the one or more conducting electrodes or the insulator and independently of movement of the at least one body member to the one or more conducting electrodes.

12. An apparatus for producing an electrosensory sensation to a body member to be stimulated, the apparatus comprising:

a conducting electrode being provided with an insulator wherein, when the body member to be stimulated being proximate to the conducting electrode, the insulator prevents a flow of direct current from the conducting electrode to the body member and a capacitive coupling over the insulator being formed between the conducting electrode and the body member;

a high-voltage source to apply an electrical input to the conducting electrode, the electrical input comprising a low-frequency component in a frequency range between 10 Hz and 1000 Hz, the capacitive coupling and the electrical input being dimensioned to produce an electrosensory sensation, and the electrosensory sensation being produced independently of any mechanical vibration of the conducting electrode or the insulator; and a modulator to convey information via the electrosensory sensation by modulating the electrical input according to the information.

13. The apparatus according to claim 12, further comprising a grounding connection between:

a reference voltage of the high-voltage source other than the electrical input to the conducting electrode; and a grounding electrode separate from the conducting electrode, wherein the grounding electrode is positioned so as to be touched by a second body member distinct from the body member to be stimulated.

14. The apparatus according to claim 12, wherein the apparatus comprises one conducting electrode for each spatially distinct area of the body member to be stimulated.

15. The apparatus according to claim 12, wherein the apparatus comprises one conducting electrode for each of several spatially distinct areas of the body member to be stimulated.

16. The apparatus according to claim 12, further comprising:

a surface arranged so as to be touched or approached by the body member, the surface having at least one touch-sensitive area, each touch-sensitive area having a predetermined position; and a controller to assign a function to the at least one touch-sensitive area and to vary an intensity of the electrosensory stimulus spatially or temporally based on a detected touching or approaching of the at least one touch-sensitive area by the body member, wherein the apparatus is able to produce feedback to a user via the body member.

17. The apparatus according to claim 16, wherein the electrosensory sensation being used to create a sensation of texture on the surface.

18. The apparatus according to claim 16, wherein the controller varies the intensity of the electro-sensory stimulus temporally, wherein the controller is operable to dynamically change the function assigned to the least one touch-sensitive area, and wherein the apparatus is operable to vary the feedback based on the function.

19. The apparatus according to claim 12, wherein the modulator modulates the electrical input based on the low-frequency component.

20. The apparatus according to claim 12, wherein the electrical input to the conducting electrode has a peak-to-peak voltage of 750 to 100,000 Volts.

21. The apparatus according to claim 12, wherein the insulator comprises a first layer and a second layer such that the first layer is closer to the conducting electrode than the second layer, and wherein the second layer has a lower surface conductivity than the first layer.

* * * * *